(12) United States Patent
Cole (10) Patent No.: US 12,475,477 B2
(45) Date of Patent: Nov. 18, 2025

(54) SYSTEMS AND METHODS FOR PREDICTIVE PRICING

(71) Applicant: ADP, Inc., Roseland, NJ (US)

(72) Inventor: Ramsay Cole, Roxbury, CT (US)

(73) Assignee: ADP, Inc., Roseland, NJ (US)

( * ) Notice: Subject to any disclaimer, the term of this patent is extended or adjusted under 35 U.S.C. 154(b) by 177 days.

(21) Appl. No.: 18/067,831

(22) Filed: Dec. 19, 2022

(65) Prior Publication Data

US 2024/0202758 A1    Jun. 20, 2024

(51) Int. Cl.
*G06Q 30/0201*    (2023.01)
(52) U.S. Cl.
CPC ............................... *G06Q 30/0206* (2013.01)
(58) Field of Classification Search
CPC ........................... G06Q 20/20; G06Q 30/0206
USPC ........................................................ 705/7.35
See application file for complete search history.

(56) References Cited

U.S. PATENT DOCUMENTS

| | | | | |
|---|---|---|---|---|
| 11,769,167 | B1* | 9/2023 | Esclusa | G06Q 20/201 |
| | | | | 705/14.25 |
| 2008/0126264 | A1* | 5/2008 | Tellefsen | G06Q 30/0283 |
| | | | | 705/400 |
| 2012/0303412 | A1* | 11/2012 | Etzioni | G06Q 30/06 |
| | | | | 705/7.31 |
| 2019/0228397 | A1* | 7/2019 | Madden | G06N 3/044 |
| 2019/0362371 | A1* | 11/2019 | Hutchinson | G06Q 30/0206 |
| 2019/0370838 | A1* | 12/2019 | Vierra | G06Q 30/0206 |
| 2020/0357037 | A1* | 11/2020 | Langdon | G06Q 30/0205 |
| 2023/0153850 | A1* | 5/2023 | Hauser | G06Q 30/0283 |
| | | | | 705/7.35 |

OTHER PUBLICATIONS

"Demographic segmentation," by John Li, May 25, 2021 (Year: 2021).*
"Dynamic Pricing Algorithm for E-commerce," by Samuel B. Hwang and Sungho Kim, p. 149-155, In: Sobh, T., Elleithy, K. (eds) Advances in Systems, Computing Sciences and Software Engineering. Springer, Dordrecht, 2006 (Year: 2006).*

* cited by examiner

*Primary Examiner* — Michael P Harrington
*Assistant Examiner* — Brian Adams Heflin
(74) *Attorney, Agent, or Firm* — Foley & Lardner LLP (57) ABSTRACT

Systems and methods are described for dynamic and predictive pricing for ecommerce systems and brick-and-mortar retail businesses for a selected geographic location or territory. In one example, a system comprises a computing device that is configured to receive a request to display a network page of an item on a client device. The computing device is further configured to determine a geographic location of the client device and determine a price for the item using a machine learning model based at least in part on the geographic location. The network page is displayed on the client device to include the price of the item.

12 Claims, 5 Drawing Sheets

SYSTEMS AND METHODS FOR PREDICTIVE PRICING

BACKGROUND

Retail companies maintain historical sales records for determining product pricing for a future time period. For example, retail companies will note that a particular promotion was effective for a particular market segment during a summer season. Subsequently, retail companies will rely on previous promotional effects and the previous sales results to determine future pricing for the next summer season.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The embodiments of the present disclosure relate to dynamic and predictive pricing for electronic commerce systems and brick-and-mortar retail businesses for a geographic location. Typically, retail companies maintain historical sales records that are used to determine product pricing for a future time period. For example, retail companies will note that a particular promotion was effective for a particular market segment during a summer season. Subsequently, retail companies will rely on previous promotional efforts and the previous sales results to determine future pricing for the next summer season.

However, this approach fails to account for dynamic events that may have recently occurred with respect to a geographic location. Examples of such events can include job layoffs, job hirings, government and private sector investments for an industry, industry trends, or similar events. These dynamic events can influence the purchasing ability of consumers in a specific geographic area. For example, a recent, massive job layoff by a major employer in a regional territory can drastically affect the purchasing ability of the residents in the regional territory. The layoffs can affect the income of other related jobs in the community. In this scenario, retailers that rely on the previous sales and pricing strategy are relying on outdated information.

The various embodiments of the present disclosure relate to improved systems and methods for dynamic and predictive pricing for a geographic location based at least in part on employment data for a selected geographic location. The embodiments can be used to provide real-time pricing data for retail brick and mortar stores and electronic commerce systems. For example, the embodiments can be used to generate a pricing strategy that is tailored to a specific geographic location. Additionally, the retail sales generated from point of sales devices in the geographic location can be fed into a predictive pricing model, which can be used for physical retail stores and webs sites accessed by the client devices of residents in the specific geographic area.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
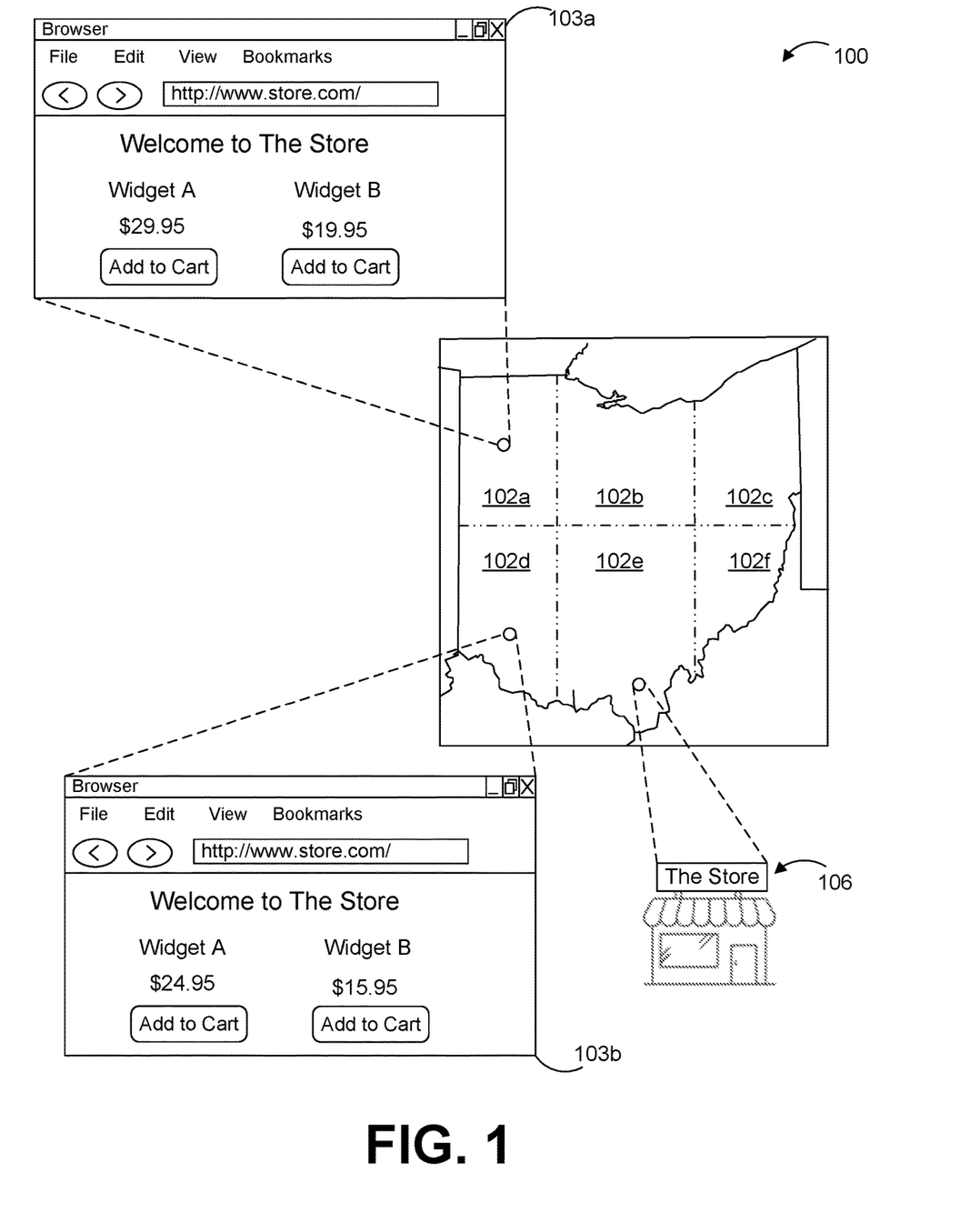
FIG. 1 is a drawing depicting an example scenario of predictive pricing for different geographic locations according to various embodiments of the present disclosure.

As illustrated in FIG. 1, shown is an example scenario of an application service that provides dynamic and predictive pricing for a physical retail location and online web sites based at least in part on employer payroll data for a particular geographic location and demographic data. As such, employer data for a specific geographic location or region can be used to dynamically determine pricing in the same geographic location or region. Some non-limiting examples of employer payroll data can include employee income, employee income trends, employee headcount, and other suitable employer payroll data. Some non-limiting examples of demographic data can include age, marital status, number of children, education level, ethnicity, gender, and other suitable demographic data.

In FIG. 1, shown is an example scenario 100 that includes a map of the state of Ohio. The map depicts the state separated into six geographic locations 102*a*-102*f* (e.g., separated by dashed lines) (collectively referred to as "the geographic locations 102"). The size of each geographic location 102 can vary. For example, in other implementations, a single geographic location 102 can be one single state, multiple states, a city, a town, a region within a state, or other suitable geographic locations. Additionally, FIG. 1 illustrates a first instance 103*a* of a web site (e.g., "The Store") displaying a first set of prices for Widget A and Widget B to a first client device located in the first geographic location 102*a*. FIG. 1 also illustrates a second instance 103*b* of the web site displaying a second set of prices for Widget A and Widget B to a second client device located in the fourth geographic location 102*d*. The different pricing can be dynamically determined between the first geographic location 102*a* and the fourth geographic location 102*b* based at least in part on employment data supplied from each location.

The embodiments of the present disclosure are used to construct a predictive pricing model that can dynamically adjust pricing in real-time based at least in part on recent events or dynamic changes for a specific geographic location 102 relating to employment data or demographics data. For example, the second set of prices is lower than the first set of prices based at least in part on use of a predictive pricing model, which indicates that the first geographic location 102*a* can support higher retail prices. For instance, a recent trend (e.g., less than six months) of higher incomes in the first geographic location 102 can be factored into the predictive model indicating a higher pricing strategy for the first geographic location 102a.

Alternatively, there may have been several employers that have recently laid off a large number of employees in the fourth geographic location 102d. The number of laid off employees can be compared to the population of residents in the geographic location 102d. As such, the predictive model can indicate that the pricing strategy for the fourth geographic location 102d should be lowered because of a decreasing trend in the income of residents living in the fourth geographic location 102d.

Further, the embodiments of the present disclosure can generate a predictive pricing model that provides a pricing strategy for products and services sold in retail locations. For example, FIG. 1 illustrates a retail location 106 in the fifth geographic location 102e. The predictive model can be used to provide an automated pricing report for products sold in the retail location 106. In some instances, point of sale (POS) data from POS devices in the retail location 106 and other retail locations can be fed into the predictive pricing model. The predictive pricing model can generate pricing recommendations for the future time periods, such as a pricing recommendation for Widget A for the next thirty days, the next 60 days, the next three months, and other suitable future time period.

Figure 2:
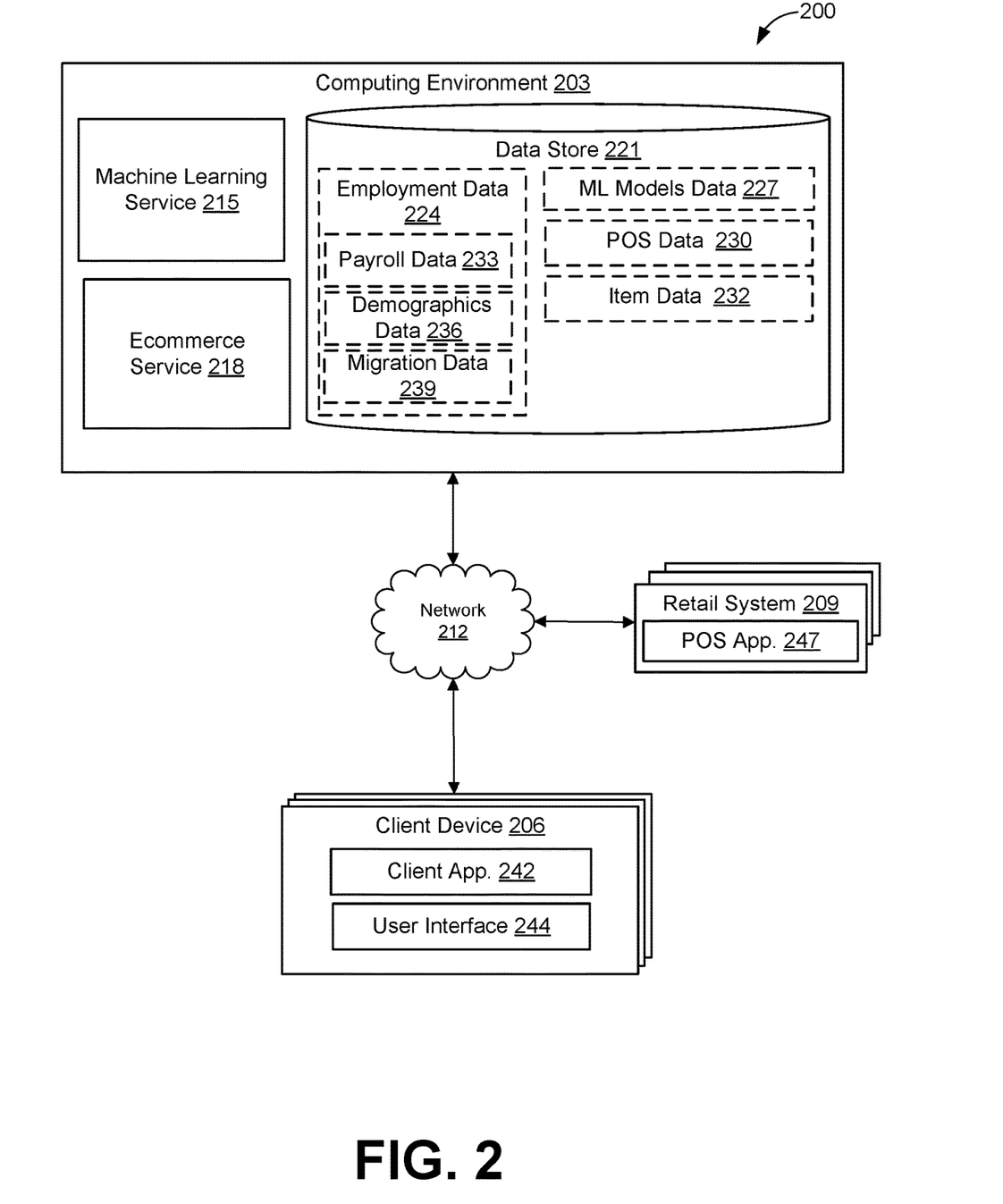
FIG. 2 is a drawing of a network environment according to various embodiments of the present disclosure.

With reference to FIG. 2, shown is a network environment 200 according to various embodiments. The network environment 200 can include a computing environment 203, a client device 206, and a retail system 209, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographic locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 can include a machine learning service 215, an electronic commerce service 218 (herein after referred to as the "ecommerce service 218"), and other applications, services, processes, systems, engines, or functionality not discussed in detail herein.

The machine learning service 215 can be executed to collect sample data from human resources systems of an employer. The machine learning service 215 can be executed to extract employment data from government and news data sources. The machine learning service 215 can be used to train, construct, evaluate, and deploy a predictive pricing model.

The ecommerce service 218 can be executed to host a website that offers items for sale. The ecommerce service 218 can receive network page requests and display the appropriate dynamic pricing for the items offered for sale by the website. The ecommerce service 218 can be used to provide automated pricing reports for retail locations of the retail system 209. The ecommerce service 218 can be executed to display a user interface that includes data visualizations for the predictive pricing models.

Also, various data is stored in a data store 221 that is accessible to the computing environment 203. The data store 221 can be representative of a plurality of data stores 221, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 221 is associated with the operation of the various applications or functional entities described below. This data can include employment data 224, machine learning models 227, point of sale (POS) data 230, item data 232, and potentially other data.

The employment data 224 can represent human resources data for an employer. The employment data 224 can include payroll data 233, demographics data 236, migration data 239, and other suitable employment related data. The payroll data 233 can include employee compensation, compensation trends, types of jobs, historical payroll data, and other suitable payroll data. The demographics data 236 can represent demographic statistics of employees employed at an organization. For example, the demographics data 236 can include age, marital status, number of children, education level, ethnicity, gender, and other suitable demographic data.

The machine learning (ML) model data 227 can represent can data associated with training, evaluating, and deploying machine learning models for predictive pricing of an item. The ML model data 227 can sample data, training data, training results data, test data, model deployment data, and other suitable machine learning data.

The POS data 230 can represent data associated with purchases completed online and/or the retail location associated with the retail system 209. The POS data 230 can include an item identifier (e.g., product name, model number), an item purchased price, transaction geographic location, quantity of items sold, item pricing trends, and other suitable POS data 230.

The item data 232 can represent data regarding items, products, and/or services for sale or lease by an organization.

The item data 232 can include an item identifier (e.g., a product identifier, serial number, a model name, a model number, etc.), a current item price, historical item pricing, and historical item sales associated with the item pricing.

The client device 206 is representative of a plurality of client devices 206 that can be coupled to the network 212. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as a client application 242 or other applications. The client application 242 can be executed in a client device 206 to access network content served up by the computing environment 203 or other servers, thereby rendering a user interface 244 on the display. To this end, the client application 242 can include a browser, a dedicated application, or other executable, and the user interface 244 can include a network page, an application screen, or other user mechanism for obtaining user input. The client device 206 can be configured to execute applications beyond the client application 242 such as email applications, social networking applications, word processors, spreadsheets, or other applications.

The retail system 209 can represent one or more retail locations that enable individuals to make purchases. The retail location can include POS devices that are used to complete purchases of items in the retail location. The retail system 209 can also represent online websites used for completing purchases. The retail system 209 can include a POS application 247. The POS application 247 can be executed by POS devices in order to complete purchases. In some examples, the POS application 247 can be used to communicate POS data 230 to the computing environment 203.

Next, a general description of the operation of the various components of the network environment 200 is provided. To begin, the operation of the embodiments can begin by the machine learning service 215 training a predictive pricing model that can be used for automated pricing reports and can be used for dynamic pricing of items on network pages 103.

As for training a predictive pricing model, the machine learning service 215 can receive payroll data 233 and demographics data 236 from one or more human resource systems for an organization. For example, an employer in a particular state can maintain payroll data 233 (e.g., employee income statistics, employee income trends, employee headcount, types of jobs) and demographic data 236 (e.g., age, marital status, number of children, education level, ethnicity, gender). The machine learning service 215 can form a sample dataset from the payroll data 233 and the demographics data 236, in which the payroll data 233 and the demographics data 236 is provided for a particular geographic location 102. The geographic location 102 selected for training the predictive pricing model can vary. For example, if a predictive pricing model is desired for an entire state as the geographic location 102, then employment data 224 for the entire state can be extracted. If a predictive pricing model is desired for a city or a regional portion of a state, then employment data 224 can be extracted for the desired geographic location 102. Thus, the geographic location 102 can be selected or specified for a predictive pricing model.

In some instances, if a human resources system does not have sufficient employment data 224 for a selected geographic location 102, then the machine learning service 215 can using web scraping techniques (e.g., text pattern matching, HTTP programming, HTML parsing, Document Object Model (DOM) parsing, etc.) for extracting payroll data 233 and demographics data 236. For example, a software application (e.g., a web crawler) may be executed to use one of the above mentioned web scraping techniques to identify and extract employment data 224 for a selected geographic location 102 or territory. For instance, web pages with job postings for the selected geographic location 102 can be identified and employment data 224 associated with the job posting can be used as employment data 224. Other examples can include identifying news articles describing job postings or job losses for the geographic location 102, which can be extracted.

The machine learning service 215 can anonymize the sample data in order to protect the identify of employees and their personal information. Various types of data anonymization can be employed. Then, the machine learning service 215 can aggregate the sample employment data with the item data 232 (e.g., a product identifier, serial number, a model name, a model number, item pricing information, etc.).

The machine learning service 215 can construct a predictive pricing model by performing an iterative analysis of the employment data 224 and item data 232 in order to identify patterns. For example, the machine learning service 215 can split the sample data into training data and testing data. Then, the machine learning service 215 can perform iterative analysis on the training data by applying predictive algorithms to construct the predictive pricing model. There are three main categories of machine learning: supervised, unsupervised, and reinforcement. Supervised machine learning comprises providing the machine with test data and the correct output value of the data. The predictive algorithms, through trial and error, decipher the patterns that exist between the input training data and the known output values to create a predictive pricing model that can reproduce the same underlying rules with new data. Examples of supervised learning algorithms can include regression analysis, decisions trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data that no one previously knew existed. Examples of algorithms used in unsupervised machine learning include k-means clustering, k-nearest neighbors (k-NN), association analysis, and descending clustering.

After the predictive pricing model is constructed, the test data is fed into the predictive pricing model to test its accuracy. In some examples, the predictive pricing model can be tested using mean absolute error, which examines each prediction in the predictive pricing model and provides an average error score for each prediction. If the error rate between the training and test dataset is below a predetermined accuracy threshold, the predictive pricing model has learned the dataset's pattern and has passed the test.

After the predictive pricing model has passed an accuracy threshold, then the machine learning service 215 can use the predictive pricing model for a selected geographic location 102 to provide automated pricing reports. For example, a web-based user interface 244 for an employer can be used to receive a selected geographic location 102 and item identifiers. Then, the machine learning service 215 can provide a pricing report that includes pricing information for the item identifiers.

In some examples, the pricing information can include forward-looking item pricing. For instance, the pricing information can include suggested pricing for the next thirty days, the next sixty days, the next ninety days, or other suitable intervals. In the brick-and-mortar retail stores, the pricing information can be useful for retail operators to determine pricing. In other retail stores, the pricing information can be relayed to display devices for automatically displaying updated item pricing.

In some examples, one or more predictive pricing models can be used with the ecommerce service 218 to provide dynamic pricing for network pages 103. The ecommerce service 218 can provide a geographic location 102 and one or more item identifiers to the machine learning service 215. The machine learning service 215 can select the appropriate predictive pricing model for the geographic location 102 and transmit item pricing to the ecommerce service 218 for displaying on the network page 103.

Figure 3:
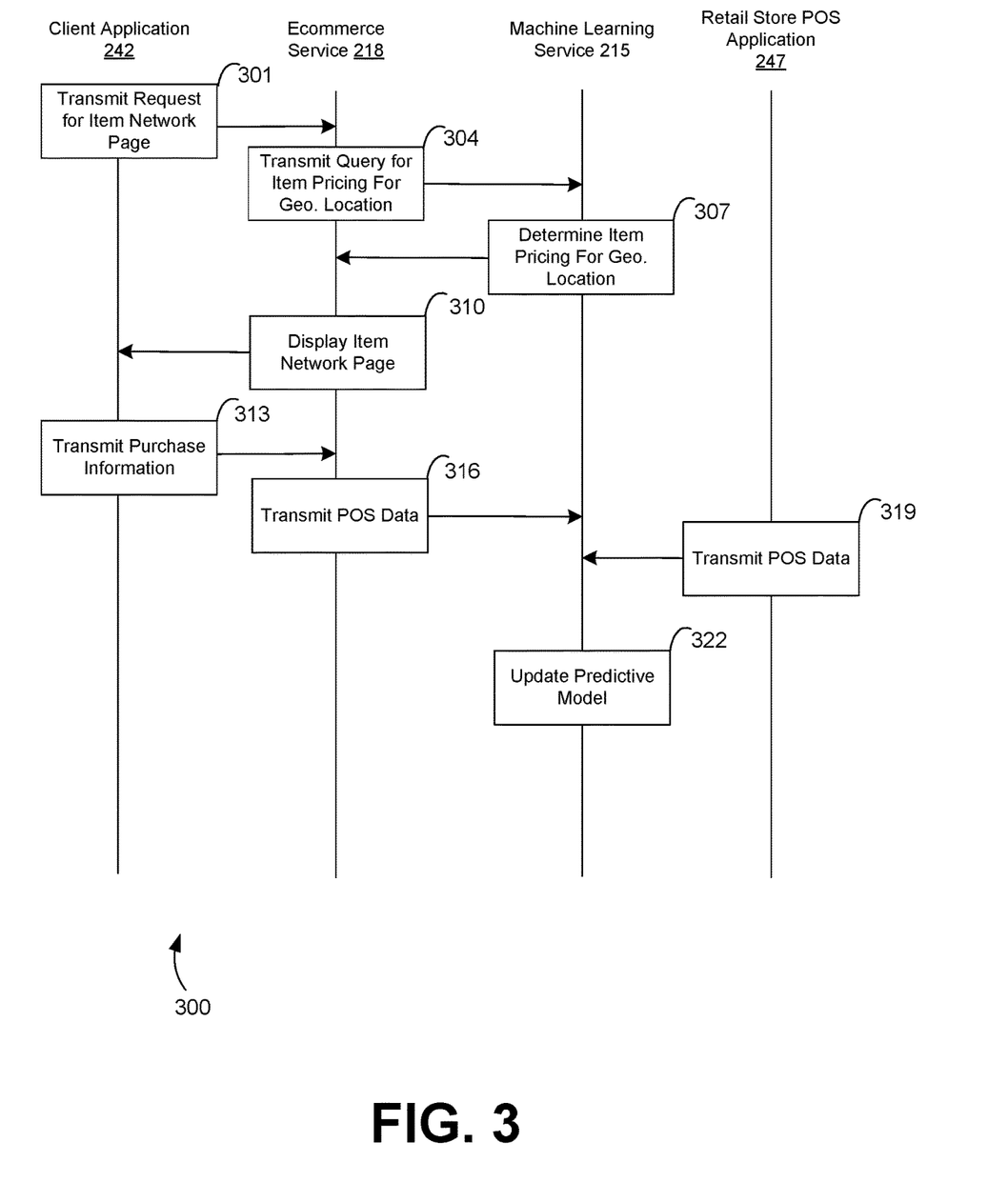
FIG. 3 is a sequence diagram illustrating an example of the interactions between various components of the network environment of FIG. 2 according to various embodiments of the present disclosure.

Turning now to FIG. 3, shown is a sequence 300 of operations performed in the network environment 200 (FIG. 2). It is understood that the sequence diagram of FIG. 3 provides merely an example of the many different types of interactions that can occur between the depicted components of the network environment 200. As an alternative, the sequence diagram of FIG. 3 may be viewed as depicting an example of elements of a method implemented in the network environment 200 (FIG. 2) according to one or more embodiments.

In box 301, the client application 242 can transmit a request for a network page 103 to be displayed on the client device 206. The request can include location data that can be used for identifying a geographic location 102 of the client device 206. The location data can include an internet protocol (IP) address associated with the client device 206, a Global Positioning System (GPS) data, WIFI data, Bluetooth data, and other suitable data can be used to identify a location of the client device.

For example, a browser executed on the client device 206 can be used to capture of the location data, such as an IP address of the client device. In another example, a browser executed on the client device 206 (e.g., a mobile phone) can access GPS location data of the client device 206 and include the GPS location data in the request. In another example, the browser can capture location data for the WIFI access point being used by the client device 206, such as a service set identifier (SSID). In another example, Bluetooth signals sent and received by the client device 206 can be captured and used to identify a location off the client device 206.

The request received by the ecommerce service 218 can also include one or more item identifiers that are intended to be displayed on the network page 103. For example, if the network page 103 is intended to display two products, then the request can include a first product identifier and a second product identifier.

In box 304, the ecommerce service 218 can transmit to the machine learning service 215 a query for an item price. The query can include a geographic location 102 for the client device 206 and an item identifier for an item that is intended to be displayed on the network page 103.

In box 307, the machine learning service 215 can determine the item price for the item based at least in part on the geographic location 102. The machine learning service 215 can use a trained predictive model for determining the item pricing. The machine learning service 215 can provide the geographic location 102 and the item identifier as input to the trained predictive model. The item pricing can be transmitted to the ecommerce service 218.

In box 310, the ecommerce service 218 can display the network page 103 after receiving the item pricing for the item. In some examples, the network page 103 with the item price is displayed within a user interface 244 as a mobile application executed by the client device 206.

In box 313, the client application 242 can transmit purchase information in a checkout page associated with the network page 103. The purchase information can include an item identifier for the purchased item and the payment information (e.g., payment instrument information).

In box 316, the ecommerce service 218 can transmit the POS data 230 to the machine learning service 215 after the completion of the purchase. The POS data 230 can include item pricing, quantity purchased, transaction time stamp, transaction location (e.g., geographic location) of the client device 206, and other suitable POS data 230.

In box 319, the POS application 247 of the retail system 209 can transmit POS data 230 to the machine learning service 215. The POS data 230 from the POS application 247 can be for brick-and-mortar retail locations (e.g., associated with the retail system 209). In some embodiments, the POS data 230 can be provided on a periodic interval (e.g., every twenty-four hours) to the machine learning service 215. In other instances, the POS application 247 can provide POS data 230 associated with the physical retail locations upon demand by the machine learning service 215 (e.g., upon receiving a request from the machine learning service 215).

In box 322, the machine learning service 325 can update one or more predictive pricing models with the POS data 230 provided from the POS application 247 for the retail system 209 and/or from the POS data 230 provided by the ecommerce service 218. The POS data 230 can be stored as training data, which can be used to improve the model accuracy.

Figure 4:
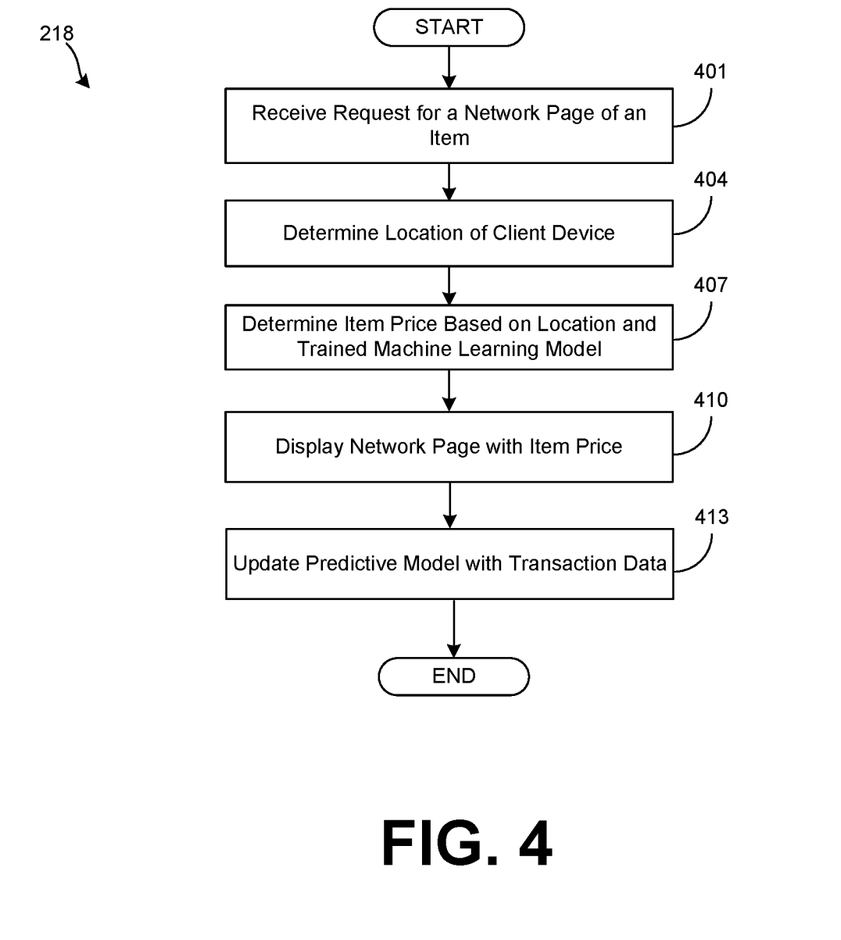
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of the ecommerce service 218. The flowchart of FIG. 4 provides merely an example of the many different types of functional arrangements that can be employed to implement the operation of the depicted portion of the ecommerce service 218. As an alternative, the flowchart of FIG. 4 can be viewed as depicting an example of elements of a method implemented within the network environment 200.

Beginning with block 401, the ecommerce service 218 can receive a request for a network page 103 of an item for sale from a client device 206. The request can be generated for displaying the network page 103 in the user interface 244 of the client device 206. The request can include location data that can be used for identifying a geographic location 102 of the client device 206. The location data can include an internet protocol (IP) address associated with the client device 206, a Global Positioning System (GPS) data, WIFI data, Bluetooth data, and other suitable data can be used to identify a location of the client device 206.

For example, a browser executed on the client device 206 can be used to capture of the IP address of the client device 206. In another example, a browser executed on the client device 206 (e.g., a mobile phone) can have access to the GPS location data of the client device 206 and include the GPS location data in the request. In another example, the browser can capture location data for the WIFI access point being used by the client device 206, such as a service set identifier (SSID). In another example, Bluetooth signals sent and received by the client device 206 can be captured and used to identify a location of the client device 206.

The request received by the ecommerce service 218 can also include one or more item identifiers that are intended to be displayed on the network page 103. For example, if the network page 103 is intended to display two products, then the request can include a first product identifier and a second product identifier.

In block 404, the ecommerce service 218 can determine a geographic location 102 of the client device 206. In some instances, the ecommerce service 218 can identify the location of the client device 206 from location data provided in the request as described above. In other instances, the ecommerce service 218 can request location data from the client device 206. A non-limiting example of a location application programming interface (API) can include a HTML5 geolocation (e.g., getCurrentPosition( )).

In block 407, the ecommerce service 218 can determine an item price based at least in part on the geographic location 102 and a trained predictive model. In some instances, the trained predictive model can be executed by the machine learning service 215. The ecommerce service 218 can provide the one or more item identifiers and the geographic location 102 of the client device 206. The machine learning service 215 can provide to the ecommerce service 218 a predictive item price for each product identifier.

In block 410, the ecommerce service 218 can display the network page with the item price on the client device 206. In some examples, the network page with the item price is displayed within a user interface 244 such as a mobile application executed by the client device 206.

In block 413, the ecommerce service 218 can update the predictive pricing model with POS data 230. The ecommerce service 218 can capture transaction data, such as sold item price, location data for client device 206, transaction time stamp, and other suitable data. The transaction data can be stored as POS data 230 and the POS data 230 can be used to update the predictive model.

Figure 5:
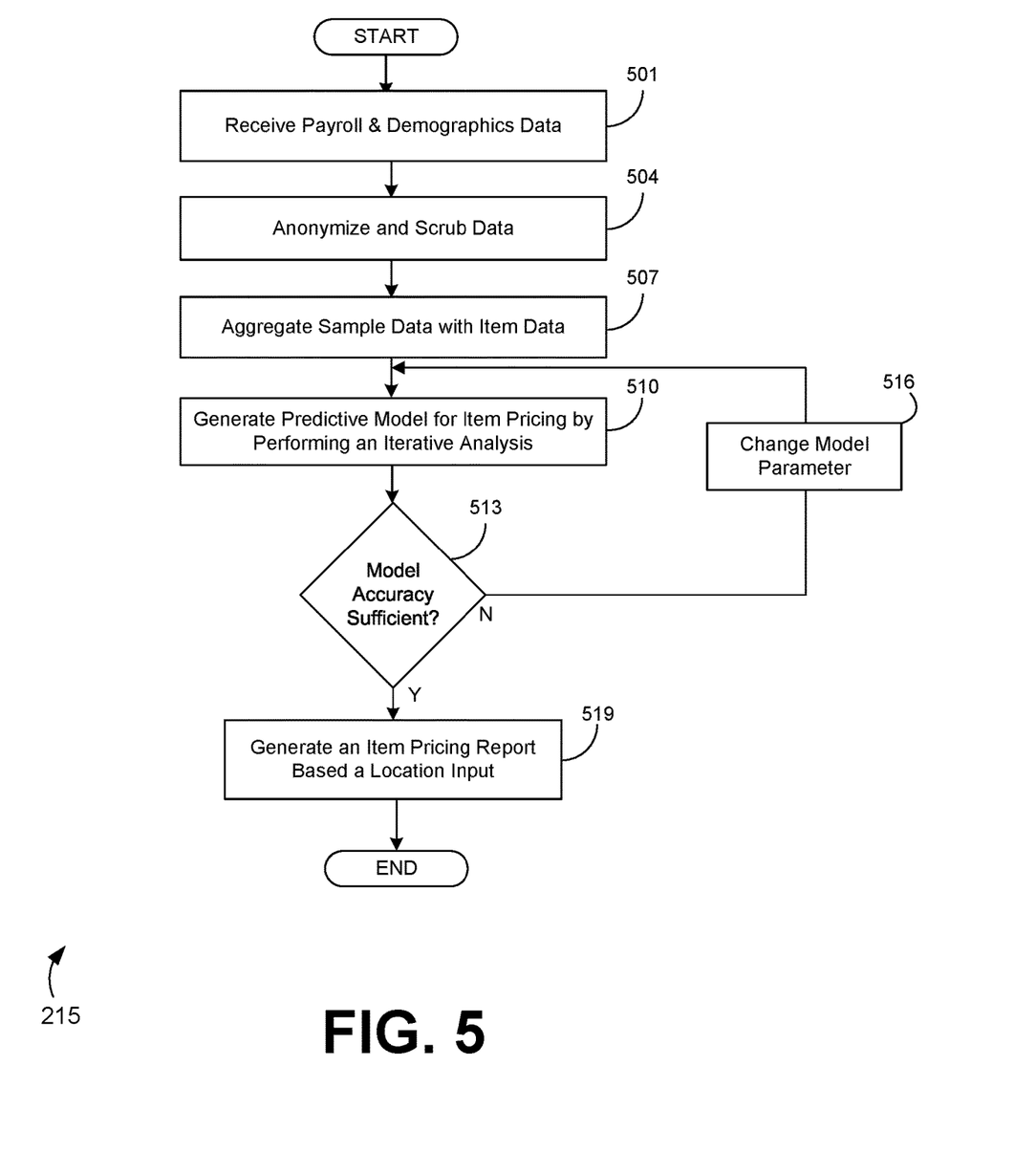
FIG. 5 is a flowchart illustrating one example of functionality implemented as portions of an application executed in a computing environment in the network environment of FIG. 2 according to various embodiments of the present disclosure.

Referring next to FIG. 5, shown is a flowchart that provides one example of the operation of a portion of the machine learning service 215. The flowchart of FIG. 5 provides merely an example of the many different types of functional arrangements that can be employed to implement the operation of the depicted portion of the machine learning service 215. As an alternative, the flowchart of FIG. 5 can be viewed as depicting an example of elements of a method implemented within the network environment 200.

Beginning with block 501, the machine learning service 215 can receive payroll data 233 and demographics data 236 and store as sample data. Some non-limiting examples of employer payroll data 233 can include employee income, employee income trends, employee headcount, and other suitable employer payroll data. Some non-limiting examples of demographic data can include age, marital status, number of children, education level, ethnicity, gender, and other suitable demographic data. In some examples, the payroll data 233 and the demographics data 236 can be received from a human resources system of an organization.

In block 504, the machine learning service 215 can anonymize and scrub the sample data. In some examples, the sample data can be anonymized by data masking, pseudonymization, generalization, and other suitable anonymization techniques. For example, the sample data can use data masking by creating a mirror image of the sample data in a database and implementing data alteration strategies, such as character shuffling, encryption, term, or character substitution. In other examples, the sample data is pseudonymized by substituting unique, private identifiers with other/false identifiers or pseudonyms, such as swapping the "John Doe" identifier with the "Richard Roe" identifier.

In some examples, the sample data can be scrubbed by refining the sample data before using it to build a predictive model. The refinement can include modifying and/or removing incomplete data or data with little predictive value (e.g., failing to meet a predictive value threshold).

In block 507, the machine learning service 215 can aggregate the sample data with the item data 232 of an organization (e.g., a retailer, a manufacturer, a wholesaler, a distributor, etc.) offering items for sale. The item data 232 can include an item identifier (e.g., a product identifier, a serial number, a model name, a model number, etc.), a current item price, historical item pricing, and historical item sales associated with the item pricing.

In block 510, the machine learning service 215 can generate a predictive pricing model by analysis. The generation of the predictive pricing model can include randomly dividing the sample data into a training subset and a test subset. The training subset can be applied to one or more predictive algorithms to construct the predictive pricing model. The test subset can be applied to the predictive pricing model to generate test results. The test results can be compared to an accuracy threshold in order to determine the effectiveness of the predictive pricing model.

In block 513, the machine learning service 215 can determine whether the predictive model has sufficient accuracy with respect to an accuracy threshold. If the accuracy meets the accuracy threshold, then the machine learning service 215 can proceed to block 519. If the accuracy does not meet the accuracy threshold, then the machine learning service 215 can proceed to block 516.

In block 516, the machine learning service 215 can change one or more model parameters in order to improve the accuracy of the predictive pricing model. For example, hyperparameters can be a particular type of model parameter that is altered. Hyperparameters can be the settings of the algorithm that control how fast the model learns patterns and which patterns to identify and analyze.

In block 519, the machine learning service 215 can deploy the predictive model for use for generating the item pricing report or for use with the ecommerce service 218 for dynamic pricing on a network page 103. For example, the item pricing reporting can be generated by providing a location input. The location input can be used to select the appropriate predictive pricing model that has been trained for an area related to the location input. As such, the location input can be used to ensure that the predictive pricing model has payroll data 233 and demographics data 236 for the location input. In one example, a store operator at a particular location can use a web-based application that for providing a store location (e.g., can be a city, a state, a mailing address, a geographical state region). The store location can be used to identify a predictive pricing model for the store location area.

In another example, the predictive pricing model can be selected for a requested network page. The client device 206 can transmit a request for a network page and can provide a location associated with the client device 206. The location of the client device 206 can be used to select a predictive pricing model.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 and the sequence diagram of FIG. 3 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 4 and 5 and the sequence diagram of FIG. 3 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIGS. 4 and 5 and the sequence diagram of FIG. 3 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
one or more processors, coupled with memory; and
machine-readable instructions stored in the memory that, when executed by the one or more processors, cause the one or more processors to at least:
receive, from a data store including non-relational and relational databases coupled to a computing environment, sample data that includes first data and attributes for a geographic location;
anonymize the sample data in order to remove types of identifiers within the sample data;
generate a first training dataset by aggregating the anonymized sample data and a data object, the data object comprising data regarding an electronic transaction conducted between a plurality of computing devices via the computing environment;
determine that an amount of data within the first training dataset is insufficient to train a machine learning model such that outputs of the machine learning model satisfy a performance threshold, the first training dataset including at least one incomplete data element;
execute, responsive to the determination that the amount of data is insufficient, a function to identify, via a network, a plurality of webpages that include second data and second attributes that complete the incomplete data element,
extract, from the plurality of webpages identified by the function, the second data and second attributes corresponding to the geographic location to complete the at least one incomplete data element;
generate a second training dataset using the first training dataset, the second data, and the second attributes extracted using the function;
subsequent to generating the second training dataset, re-generate the machine learning model by using the second training dataset, wherein to re-generate the machine learning model, the one or more processors:
randomly divide the second training dataset into a training subset and a test subset, wherein
the training subset corresponds to the training dataset, the second data, and the second attributes, and
the test subset corresponds to the data object;
train the machine learning model by applying the training subset to the machine learning model to generate test data; and
determine that the test data satisfies the performance threshold based on a comparison between the test data and the test subset;
generate, using the machine learning model, a report for the data object based at least in part on an upcoming time period of the electronic transaction;
responsive to receiving, from a client device coupled to the computing environment, a request indicating an identifier of the data object, generate a user interface configured to identify an instance of a network page that corresponds to the identifier of the data object, the instance of the network page associated with the geographical location; and
transmit, for display on the client device, the generated user interface including the instance of the network page and the report.

2. The system of claim 1, wherein the machine-readable instructions, when executed by the one or more processors, cause the one or more processors to:
receive point of sale (POS) data of a retail service associated with the geographic location; and
update the machine learning model based at least in part on the POS data.

3. The system of claim 1, wherein the machine-readable instructions, when executed by the one or more processors, cause the one or more processors to:
refine the sample data by removing at least one incomplete data element.

4. The system of claim 1, wherein the machine learning model comprises a pattern associated with the first data for the geographic location and the data object in the geographic location.

5. A method, comprising:
receiving, by one or more processors from a data store including non-relational and relational databases coupled to a computing environment, sample data that includes first data and attributes for a geographic location;
anonymizing, by the one or more processors, the sample data in order to remove types of identifiers within the sample data;
generating, by the one or more processors, a first training dataset by aggregating the anonymized sample data and a data object, the data object comprising data regarding an electronic transaction conducted between a plurality of computing devices via the computing environment;
determining, by the one or more processors, that an amount of data within the first training dataset is insufficient to train a machine learning model such that outputs of the machine learning model satisfy a performance threshold, the first training dataset including at least one incomplete data element;
executing, by the one or more processors, responsive to the determination that the amount of data is insufficient, a function to identify, via a network, a plurality of webpages that include second data and second attributes that complete the incomplete data element, extracting, by the one or more processors from the plurality of webpages identified by the function, the second data and second attributes corresponding to the geographic location to complete the at least one incomplete data element;

generating, by the one or more processors, a second training dataset using the first training dataset, the second data, and the second attributes extracted using the function;

subsequent to generating the second training dataset, re-generating, by the one or more processors, the machine learning model by using the second training dataset, wherein to re-generating the machine learning model further comprises:

randomly dividing, by the one or more processors, the second training dataset into a training subset and a test subset, wherein
- the training subset corresponds to the training dataset, the second data, and the second attributes, and
- the test subset corresponds to the data object;

training, by the one or more processors, the machine learning model by applying the training subset to the machine learning model to generate test data; and determining, by the one or more processors, that the test data satisfies the performance threshold based on a comparison between the test data and the test subset;

generating, by the one or more processors using the machine learning model, a report for the data object based at least in part on an upcoming time period of the electronic transaction;

responsive to receiving, from a client device coupled to the computing environment, a request indicating an identifier of the data object, generating, by the one or more processors, a user interface configured to identify an instance of a network page that corresponds to the identifier of the data object, the instance of the network page associated with the geographical location; and transmitting, by the one or more processors, for display on the client device, the generated user interface including the instance of the network page and the report.

6. The method of claim 5, further comprising:
receiving, by the one or more processors, point of sale (POS) data of a retail service associated with the geographic location; and
updating, by the one or more processors, the machine learning model based at least in part on the POS data.

7. The method of claim 5, further comprising:
refining, by the one or more processors, the sample data by removing at least one incomplete data element.

8. The method of claim 5, wherein the machine learning model comprises a pattern associated with the first data for the geographic location and the data object in the geographic location.

9. A non-transitory computer readable medium storing instructions that, when executed by one or more processors, cause the one or more processors to:
receive, from a data store including non-relational and relational databases coupled to a computing environment, sample data that includes first data and attributes for a geographic location;
anonymize the sample data in order to remove types of identifiers within the sample data;
generate a first training dataset by aggregating the anonymized sample data and a data object, the data object comprising data regarding an electronic transaction conducted between a plurality of computing devices via the computing environment;
determine that an amount of data within the first training dataset is insufficient to train a machine learning model such that outputs of the machine learning model satisfy a performance threshold, the first training dataset including at least one incomplete data element;
execute, responsive to the determination that the amount of data is insufficient, a function to identify, via a network, a plurality of webpages that include second data and second attributes that complete the incomplete data element,
extract, from the plurality of webpages identified by the function, the second data and second attributes corresponding to the geographic location to complete the at least one incomplete data element;
generate a second training dataset using the first training dataset, the second data, and the second attributes extracted using the function;
subsequent to generating the second training dataset, re-generate the machine learning model by using the second training dataset, wherein to re-generate the machine learning model, the instructions cause the one or more processors to:
randomly divide the second training dataset into a training subset and a test subset, wherein
- the training subset corresponds to the training dataset, the second data, and the second attributes, and
- the test subset corresponds to the data object;

train the machine learning model by applying the training subset to the machine learning model to generate test data; and
determine that the test data satisfies the performance threshold based on a comparison between the test data and the test subset;
generate, using the machine learning model, a report for the data object based at least in part on an upcoming time period of the electronic transaction;
responsive to receiving, from a client device coupled to the computing environment, a request indicating an identifier of the data object, generate a user interface configured to identify an instance of a network page that corresponds to the identifier of the data object, the instance of the network page associated with the geographical location; and
transmit, for display on the client device, the generated user interface including the instance of the network page and the report.

10. The non-transitory computer readable medium of claim 9, wherein the instructions cause the one or more processors to:
receive point of sale (POS) data of a retail service associated with the geographic location; and
update the machine learning model based at least in part on the POS data.

11. The non-transitory computer readable medium of claim 9, wherein the instructions cause the one or more processors to:
refining, by the one or more processors, the sample data by removing at least one incomplete data element.

12. The non-transitory computer readable medium of claim 9, wherein the machine learning model comprises a pattern associated with the first data for the geographic location and the data object in the geographic location.

* * * * *